United States Patent [19]

Kohlhaupt

[11] Patent Number: 5,116,997
[45] Date of Patent: May 26, 1992

[54] PURIFICATION OF INDIGO

[75] Inventor: Reinhold Kohlhaupt, Frankenthal, Fed. Rep. of Germany

[73] Assignee: BASF Aktiengesellschaft, Ludwigshafen, Fed. Rep. of Germany

[21] Appl. No.: 684,874

[22] Filed: Apr. 15, 1991

[51] Int. Cl.$^5$ ................................ C09B 7/00
[52] U.S. Cl. .................... 548/457; 548/458
[58] Field of Search ........................ 548/457

[56] References Cited

FOREIGN PATENT DOCUMENTS 0335524 10/1989 European Pat. Off. ............ 548/457
0124027  9/1979 Japan ................................. 548/457

Primary Examiner—David B. Springer
Attorney, Agent, or Firm—Oblon, Spivak, McClelland, Maier & Neustadt

[57] ABSTRACT

A process for the purification of indigo comprises treating the indigo with sulfuric acid to give indigo sulfate, separating off and subsequently hydrolyzing the latter to re-form indigo, and then treating the dye with dilute hydrogen peroxide solution.

5 Claims, No Drawings

PURIFICATION OF INDIGO

Indigo is the largest-volume synthetic textile dye worldwide. Despite well-established production processes, it still contains impurities, for example up to 0.6% by weight of aniline and 0.4% by weight of N-methylaniline and furthermore smaller amounts of other undesired compounds.

Attempts to remove aromatic amines from indigo by known processes, for example by washing or by stirring with dilute acids, by steam distillation or by extraction with organic solvents, have hitherto not been successful, even if the dye is very finely ground.

It is therefore an object of the present invention to develop an effective and economical process for the purification of indigo in which the dye obtained is free or at least very substantially free from aromatic amines and other impurities.

We have found that this object is achieved by a process in which the dye, after its synthesis, is first converted into the sulfate and then liberated again by hydrolysis, and the indigo recovered in this way is subsequently treated with hydrogen peroxide.

Through treatment with sulfuric acid, the anilines present as impurities are likewise converted into their sulfates and dissolved, so that they can be removed by filtration. By following the hydrolysis of the indigo sulfate by treatment with hydrogen peroxide, further impurities are, surprisingly, destroyed by oxidation, giving pure indigo. Even without a prior reduction in the aniline concentration by formation of indigo sulfate, other impurities in technical-grade indigo can be destroyed by treatment with hydrogen peroxide.

The sulfate can be formed by reacting either water-containing indigo paste or the dried dye with sulfuric acid. The concentration of the sulfuric acid used is from 60 to 100% by weight, depending on the dry solids content of the indigo.

In order to avoid losses in yield due to sulfation of the indigo, a very low reaction temperature of from 0° to 60° C. is selected. The indigo sulfate formed is hydrolyzed by reaction with water, with re-formation of indigo. The oxidative destruction of the other impurities present in the indigo is effected by treatment with a from 0.1 to 10.0% strength by weight dilute sulfuric acid solution of hydrogen peroxide at from 0° to 100° C., the sulfuric acid concentration being from 1.0 to 10.0% by weight.

The sulfuric acid filtrate obtained on filtration after hydrolysis can be re-used for sulfate formation.

The novel process can particularly advantageously be carried out by stirring one part of indigo powder into from 10 to 20 parts, preferably into 15 parts, of from 65 to 85% strength by weight, preferably 75% strength by weight, sulfuric acid at from 0° to 60° C., preferably at 25° C. After a reaction time of from 0.5 to 3.0 hours, preferably 1 hour, at 25° C., the black-brown indigo sulfate formed in quantitative yield is filtered off with suction. The sulfuric acid filtrate, which contains the dissolved sulfates of the aromatic amines and has a sulfuric acid concentration of 75% by weight, can generally be re-used ten times or more for the formation of indigo sulfate and then passed to a sulfuric acid recovery plant.

The product obtained on filtration of the indigo sulfate is hydrolyzed in the filter by washing with water at from 10 to 50° C., preferably at 20° C. The indigo which re-forms in this step is subsequently washed in the filter at from 10 to 50° C., preferably at 20° C., with a from 0.1 to 10.0% strength by weight, preferably a 3.0% strength by weight, aqueous hydrogen peroxide solution containing 1 to 10.0% by weight, preferably 5.0% by weight, of sulfuric acid.

After washing with water and drying, the purified indigo, recovered in a yield of greater than 99% (purity ≧96%, measured photometrically) only contains from 0.021 to 0.062% of aniline and from 0° to 0.005% of N-methylaniline.

The examples below are intended to illustrate the process in greater detail. Parts and percentages are by weight.

EXAMPLE 1

200 parts of indigo powder are stirred at from 20° to 25° C. into 3,000 parts of sulfuric acid (75% strength). The reaction mixture is stirred at this temperature for a further 1 hour and subsequently filtered with suction: The black-brown indigo sulfate is washed in the filter first with 100 parts of 75% strength sulfuric acid and subsequently with 5,000 parts of 3% strength hydrogen peroxide solution, in both cases at from 20° to 25° C. The indigo re-formed by hydrolysis is then washed further with 500 parts of water and dried, giving 199.5 parts of the dye, corresponding to a yield of 99.8% of theory. The indigo is 97.0% pure (measured photometrically). The aniline content is 0.021% and the N-methylaniline content is <10 ppm.

Removal of indigo sulfate by filtration gives 2,512 parts of sulfuric acid filtrate, which, after the addition of 488 parts of sulfuric acid (75% strength), is re-used for the formation of indigo sulfate.

EXAMPLE 2

After the indigo sulfate filtrate has been re-used 5 times, sufficient sulfuric acid (75% strength) is added, as described in Example 1, so that the filtrate contains a total of 3,000 parts of 75% strength sulfuric acid.

The procedure described in Example 1 is then followed, giving 199.3 parts of indigo (99.7% of theory) having a purity of 96.0% (measured photometrically). The dye contains 0.056% of aniline and 0.01% of N-methylaniline.

EXAMPLE 3

After the indigo sulfate filtrate has been re-used 10 times, the procedure described in Example 2 is followed, giving 199.8 parts of indigo (99.9% of theory) having a purity of 96.0%. The dye contains 0.056% of aniline and 0.007% of N-methylaniline.

EXAMPLE 4

182 parts of aqueous indigo paste (dry solids content 27.5%) containing 50 parts of indigo are treated in a stirred reactor with cooling at from 20° to 25° C. over the course of 1 hour with 472 parts of sulfuric acid (96% strength). The reaction mixture is stirred for a further 3 hours at from 20° to 25° C. and subsequently filtered with suction. The black-brown indigo sulfate is washed in the filter with 1,250 parts of 3% strength hydrogen peroxide solution at from 20° to 25° C.

The indigo re-formed by hydrolysis is subsequently washed with 150 parts of water and finally dried, giving 48.8 parts (97.6% of theory) of indigo having a purity of 95.2% (measured photometrically). The dye contains 0.02% of aniline and 0.005% of N-methylaniline.

EXAMPLE 5

181 parts of aqueous indigo paste containing 51.2 parts of indigo are stirred in a stirred reactor with 170 parts of 5% strength sulfuric acid at from 20° to 25° C. The mixture is heated to 90° C., and 13.2 parts of 10% strength aqueous hydrogen peroxide solution are added dropwise at this temperature over the course of 2 hours with stirring. The mixture is stirred for a further 2 hours at 90° C. and filtered while hot, and the product is washed with water until neutral and dried, giving 50.4 parts of indigo (98.4% of theory) having a purity of 97.0% (measured photometrically).

I claim:

1. A process for the purification of indigo, which comprises reacting the indigo with sulfuric acid to give indigo sulfate, separating off and subsequently hydrolyzing the latter to re-form indigo, and then treating the dye with dilute hydrogen peroxide solution.

2. A process as claimed in claim 1, wherein indigo is reacted with from 65 to 85% strength, preferably with 75% strength, sulfuric acid in a weight ratio of from 1:10 to 1:20, preferably 1:15.

3. A process as claimed in claim 1, wherein the reaction of indigo with sulfuric acid is carried out at from 0° to 60° C., preferably at 25° C., for from 0.5 to 3 hours, preferably for 1 hour.

4. A process as claimed in claim 1, wherein the dye is treated with an aqueous, from 0.1 to 10.0% strength, preferably 3% strength, sulfuric acid solution of hydrogen peroxide in a weight ratio of from 1:10 to 1:40, preferably from 1:6 to 1:25.

5. A process as claimed in claim 4, wherein the hydrogen peroxide treatment of indigo is carried out at from 0° to 100° C., preferably at from 20° to 90° C.

* * * * *